Aug. 24, 1965   N. J. WAECKER ETAL   3,202,385
SEAL FOR HIGH DIFFERENTIAL PRESSURES
Filed May 5, 1964
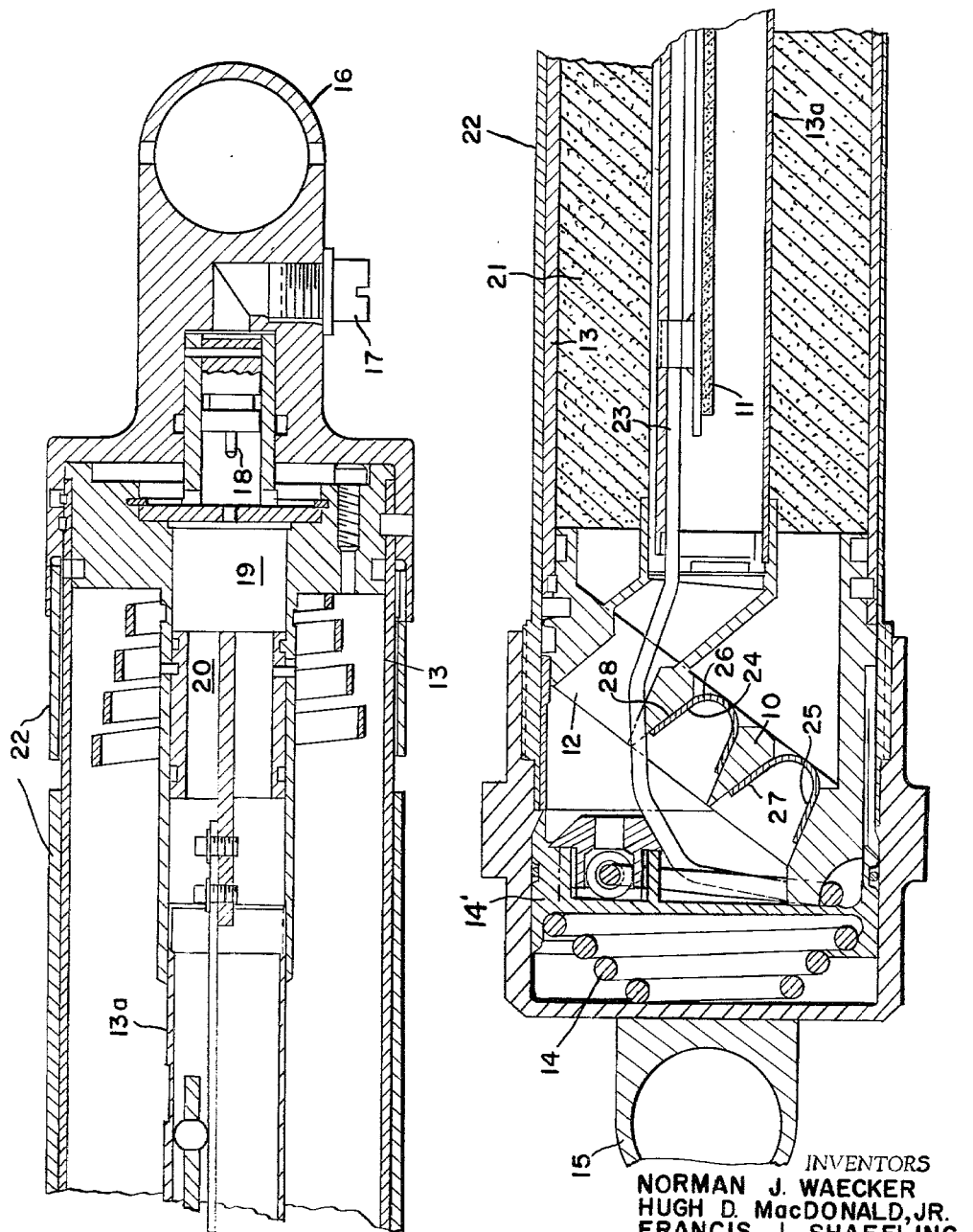
INVENTORS
NORMAN J. WAECKER
HUGH D. MacDONALD, JR.
FRANCIS J. SHAFFLING
ATTORNEYS 3,202,385
SEAL FOR HIGH DIFFERENTIAL
PRESSURES
Norman J. Waecker, Masonville, and Hugh D. Mac-Donald, Jr., Cinnaminson, N.J., and Francis J. Shaffing, Philadelphia, Pa., assignors to the United States of America as represented by the Secretary of the Army
Filed May 5, 1964, Ser. No. 365,215
5 Claims. (Cl. 244—122)
(Granted under Title 35, U.S. Code (1952), sec. 266)

The invention described herein may be manufactured and used by or for the Government for governmental purposes without the payment to us of any royalty thereon.

This invention relates to a seal for a rocket nozzle which must open under a small pressure. An object of this invention is to provide such a seal for a rocket nozzle that is safe to personnel who are not being simultaneously ejected with ejected personnel as well as being safer to an aircraft body and its component parts.

Heretofore, such a nozzle has been sealed by a tapered metal plug which may or may not have been assisted by adhesive or frangible securing means and depended largely on the taper to hold it in place against the heavier initial thruster pressure but yet was capable of being blown out by a lesser rocket pressure from an opposite side. One difficulty encountered has been the movement of these plugs, or substantial parts thereof, with increasing velocities to puncture the aircraft body and to endanger any occupant of an aircraft who was not being ejected substantially simultaneously with an occupant to be ejected.

We have investigated the difficulty and have discovered what is believed to be a cure as well as a possible cause of the hazard. It is believed the heavy metal plugs were used for strength because of the high pressures of about 1500 pounds per square inch encountered in the initiating thrust. Additionally, a heel plate was found to be necessary in order to retain the tapered plugs which were secured in position by rubber compression members installed between the heel plate and the outer face of the plug. The heel plate was fastened to the nozzle by machine screws selected such that their tensile load would equal the desired rupture load equivalent to ignition pressure. This heel plate was found to be a most lethal missile.

The heel plate was then retained to the nozzle block by a large hinge and the plug assembly fastened in turn by screws to the heel plate thus creating unnecessary clearance problems in the cockpit and excessive overdesigning of the nozzle block with attendant increases in weight. These and other disadvantages are overcome by the present invention.

According to this invention it has been discovered that a light weight, thin-walled, cup-shaped tapered plug with a generally hemispherical base has been able to withstand the higher pressure of the propellant actuated thruster but not the lower pressure of the rocket propellant. We have proceeded on the well known theory relating to thin walled spherical pressure vessels having more strength to withstand internal than external pressures. While our cups are not spherical, the tapered walls thereof fit against the tapered walls of the nozzle and their base portions are of generally hemispherical shape. Extensive tests have proven our design to be safe and adequate. The term "consumable" used herein applies to our plug whether it is consumed by combustion, heat of vaporization, adhesive failure, reverse draw, or by pressure. No evidence of the products of its destruction have been found upon which to build a more certain belief. A puzzling phase of this invention is the ability of the cup to withstand the higher pressures of the propellant actuated thruster but not the lower pressures of the rocket propellant. A possible theory may be that the temperature and velocity of any pressure or shock wave of the initiating propellant is far below that of the rocket propellant although the static pressure of the latter is lower.

Referring to the drawing, the broken single figure shows a multiport nozzle partly in cross section and containing a consumable cup of this invention.

The multiport nozzle head 10 is located at the lower end portion of an inner tube 23 containing initiating or catapult propellant 11 for the piston actuated thruster which has a nozzle 12 through which issue products of combustion for initiating seat ejection. The lower end portion of motor tube or outer cylinder 13 of the piston actuated thruster may contain a spring 14 and can assembly 14' to assist in the securing of the catapult in the locked position and hence retaining the seat. A fitting 15 of any desired shape secures the catapult to some portion of the aircraft frame. At the opposite end a similar fitting 16 is secured to the seat to be ejected. A convenient source of fluid pressure is supplied through a fitting 17, moves the firing pin 18 for engaging a primer or booster 19 for firing propellant 11 for the piston type thruster. A rocket propellant 21 is contained in the space surrounding propellant 11. Upper end 22 of the motor tube or cylinder 13 extends to adjacent the connection 16. Inner cylinder 13a, or booster tube, having its lower end closed by the nozzle 10, functions as a piston or plunger for moving the connection 16 which is secured to the seat to be ejected. A cable 23 is fixed at its lower end to the aircraft frame and its upper end is connected to a slide valve assembly 20 by means of which flame from initiating propellant 11 ignites the rocket propellant 21 after the inner cylinder 13a and the seat being ejected have moved outward to be ready to clear the upper and outer end of the outer cylinder 13, so that a fairly smooth thrust on the seat and its occupant results. All of the foregoing numbered apparatus is prior art and is described in U.S. Patent No. 2,954,947, for Rocket Assisted Pilot Ejection Catapult, and U.S. Patent No. 3,035,796, for Dual Thrust Rocket Booster Tube. The present invention is disclosed hereinafter.

The thin walled cups 24, 25 and as many others as may be applied to the nozzle head 10 but not to the open recess or nozzle 12 for the piston actuated thruster, are placed in position as indicated. Each cup may be retained in place with a consumable adhesive 28 such as one of nitrocellulose, for example. Preferably, each such cup will have a hemispherical base 26, to provide maximum strength in resisting pressures therewithin. The cup side walls 27 snugly fit the sides of the rocket nozzles in the nozzle head, and thus assuring the pressure of the initiating propellant 11 reaching only the lower or left side of head 10 and not the upper or right side. In other words the high static pressure, from the catapult propellant 11 of about 1500 pounds per square inch reaches only the concave side of these cups. It is the lower pressure from the rocket propellant of about 1000 pounds per square inch that is applied to the convex side of the hemispherical base 26 of each cup and causes its collapse. Each cup may be an aluminum alloy known commercially as 52S and having walls of a thickness of 0.015 of an inch, said alloy comprising about the following percentages by weight: 0.25 chromium, 2.5 magnesium, and 97.25 aluminum. It will be understood, of course, that any suitable material may be used advantageously, including metals, alloys, and plastics, and we do not intend to be limited to the above embodiment, in composition or dimensions, which are presented for purposes of illustration only. The taper to the cup side walls is the usual taper, or about 28° to the axis of each nozzle. These thin walled consumable metal cups have been successfully tested and found to function as desired in being capable of withstanding the higher pressure within the cup than that pressure capable of consuming it when the action is outside of the radial base. We have also found that the shear strength of the adhesive used to bond the cup to the nozzle exit walls influences the degree of destruction of the cup. In the theoretical case where no adhesive is employed or where an extremely low strength adhesive is used the cups will exit substantially intact. When the strength in shear of the adhesive becomes greater than the flexing resistance of the cup itself, the cup will reverse draw, burn and rupture, while the adhesive will fail locally and progressively at the intersection circle of the cup, nozzle wall and gas.

Among the advantages to be derived from the practice of this invention are the increased safety to remaining occupants and the plane from which the seat is ejected and the elimination of heavy metal plugs, being ejected at dangerous velocities. Our thin wall aluminum alloy cups are consumed leaving no trace to indicate whether they were oxidized, vaporized, or broken into inconspicuous fine particles. It is believed possible that all three might have assisted in their consummation.

We claim:

1. In an ejection seat apparatus for use in aircraft in which an initial thrust is imparted to an ejection seat by the operation of a propellant actuated piston type thruster and a subsequent thrust is imparted to said seat by the operation of a propellant actuated rocket fired in response to a predetermined travel of said seat, said rocket having a venturi nozzle closed during application of pressure from propellant actuating said thruster but adapted to open during application of a less pressure from propellant actuating said rocket, the combination therewith of the improvement for reducing the hazard to the body of said aircraft and an occupant thereof not being simultaneously ejected with ejected personnel, from plug and sealing material blown out of said venturi nozzle and accelerated in the rocket exhaust, said improvement including a tapered, thin-walled cup within said venturi nozzle mating therewith and having a convex base fitted with an outer and lower tapered nozzle portion and adapted to withstand the propellant pressure of said thruster against the inside of said cup and capable of being consumed under said less pressure of said rocket propellant tending to blow said cup outward and downward, said cup being formed of a consumable material.

2. A combination according to claim 1 in which said cup is made of an aluminum alloy having a base of substantially hemispherical shape.

3. A combination according to claim 2 in which said alloy consists essentially of 97.25 weight percent aluminum, about 2.5 weight percent magnesium, and about .25 weight percent chromium, and the walls and base of said cup are about 0.015 inch thick.

4. A combination according to claim 3 in which the arrangement of said cup within said nozzle is plural in number, forming what is known as a multiport nozzle head.

5. A combination according to claim 4 in which said multiport nozzle head has all but one of its ports closed and functioning as a part of the piston of said thruster during intial movement of said seat, said closed ports being closed by the tapered cups therein.

References Cited by the Examiner
UNITED STATES PATENTS

| | | | |
|---|---|---|---|
| 2,627,160 | 2/53 | MacDonald | 60—35.6 |
| 2,954,947 | 10/60 | Zabelka et al. | 244—122 |
| 3,020,710 | 2/62 | Herzog | 60—35.6 |

MILTON BUCHLER, *Primary Examiner.*

FERGUS S. MIDDLETON, *Examiner.*